United States Patent
Elbaz et al.

(10) Patent No.: US 7,925,610 B2
(45) Date of Patent: Apr. 12, 2011

(54) DETERMINING A MEANING OF A KNOWLEDGE ITEM USING DOCUMENT-BASED INFORMATION

(75) Inventors: Gilad Israel Elbaz, Santa Monica, CA (US); Adam J. Weissman, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 292 days.

(21) Appl. No.: 10/690,328

(22) Filed: Oct. 21, 2003

(65) Prior Publication Data

US 2004/0243565 A1    Dec. 2, 2004

Related U.S. Application Data

(63) Continuation-in-part of application No. 09/493,701, filed on Jan. 28, 2000, now Pat. No. 6,816,857, which is a continuation-in-part of application No. 09/431,760, filed on Nov. 1, 1999, now Pat. No. 6,453,315.

(60) Provisional application No. 60/155,667, filed on Sep. 22, 1999, provisional application No. 60/491,422, filed on Jul. 30, 2003.

(51) Int. Cl.
   *G06F 17/00* (2006.01)
   *G06N 7/00* (2006.01)
   *G06N 7/08* (2006.01)

(52) U.S. Cl. ........................................................ 706/55

(58) Field of Classification Search ............... 706/1, 15, 706/45, 6, 12, 13, 18, 21, 48, 53, 46, 55; 700/1, 90; 395/200.53; 705/10; 707/3, 1, 707/10, 536; 709/204, 223
See application file for complete search history.

(56) References Cited

U.S. PATENT DOCUMENTS

| | | | |
|---|---|---|---|
| 4,839,853 A | 6/1989 | Deerwester et al. |
| 5,056,021 A | 10/1991 | Ausborn |
| 5,128,865 A | 7/1992 | Sadler |
| 5,325,298 A | 6/1994 | Gallant |
| 5,404,506 A | 4/1995 | Fujisawa et al. |
| 5,499,360 A | 3/1996 | Barbara et al. |
| 5,619,709 A | 4/1997 | Caid et al. |
| 5,680,511 A | 10/1997 | Baker et al. |

(Continued)

FOREIGN PATENT DOCUMENTS

EP    1160686    12/2001

(Continued)

OTHER PUBLICATIONS

'Web Advertising': McCandless, Jun. 1998, IEEE Intelligent systems, pp. 8-9.*

(Continued)

*Primary Examiner* — Michael B. Holmes
*Assistant Examiner* — Peter Coughlan
(74) *Attorney, Agent, or Firm* — Fish & Richardson P.C.

(57) ABSTRACT

Systems and methods that determine a meaning of a knowledge item using related information are described. In one aspect, a knowledge item is received, related information associated with the knowledge item is received, at least one related meaning based on the related information is determined, and a knowledge item meaning for the knowledge item based at least in part on the related meaning is determined. Several algorithms and types of related information useful in carrying out such systems and methods are described.

53 Claims, 6 Drawing Sheets

U.S. PATENT DOCUMENTS

| | | | |
|---|---|---|---|
| 5,694,523 | A | 12/1997 | Wical |
| 5,708,822 | A | 1/1998 | Wical |
| 5,724,571 | A | 3/1998 | Woods |
| 5,768,580 | A | 6/1998 | Wical |
| 5,778,362 | A | 7/1998 | Deerwester |
| 5,778,363 | A | 7/1998 | Light |
| 5,778,364 | A | 7/1998 | Nelson |
| 5,794,050 | A | 8/1998 | Dahlgren et al. |
| 5,845,278 | A | 12/1998 | Kirsch et al. |
| 5,848,396 | A * | 12/1998 | Gerace ............................ 705/10 |
| 5,867,799 | A * | 2/1999 | Lang et al. ....................... 707/1 |
| 5,873,056 | A | 2/1999 | Liddy et al. |
| 5,878,223 | A * | 3/1999 | Becker et al. ................. 709/223 |
| 5,887,120 | A | 3/1999 | Wical |
| 5,918,236 | A | 6/1999 | Wical |
| 5,930,788 | A | 7/1999 | Wical |
| 5,933,822 | A | 8/1999 | Braden-Harder et al. |
| 5,940,821 | A | 8/1999 | Wical |
| 5,953,718 | A | 9/1999 | Wical |
| 5,956,740 | A * | 9/1999 | Nosohara ...................... 715/264 |
| 5,960,383 | A | 9/1999 | Fleischer |
| 5,987,404 | A | 11/1999 | Della Pietra et al. |
| 6,038,560 | A | 3/2000 | Wical |
| 6,044,375 | A | 3/2000 | Shmueli et al. |
| 6,061,675 | A | 5/2000 | Wical |
| 6,067,552 | A | 5/2000 | Yu |
| 6,101,515 | A | 8/2000 | Wical et al. |
| 6,112,201 | A | 8/2000 | Wical |
| 6,119,164 | A | 9/2000 | Basche |
| 6,134,532 | A | 10/2000 | Lazarus et al. |
| 6,199,034 | B1 | 3/2001 | Wical |
| 6,240,410 | B1 | 5/2001 | Wical |
| 6,247,009 | B1 | 6/2001 | Shiiyama |
| 6,269,361 | B1 | 7/2001 | Davis et al. |
| 6,289,342 | B1 | 9/2001 | Lawrence et al. |
| 6,289,353 | B1 | 9/2001 | Hazlehurst et al. |
| 6,298,348 | B1 | 10/2001 | Eldering |
| 6,314,419 | B1 | 11/2001 | Faisal |
| 6,324,519 | B1 | 11/2001 | Eldering |
| 6,324,538 | B1 | 11/2001 | Wesinger et al. |
| 6,421,675 | B1 | 7/2002 | Ryan et al. |
| 6,453,315 | B1 | 9/2002 | Weissman et al. |
| 6,460,034 | B1 | 10/2002 | Wical |
| 6,473,730 | B1 | 10/2002 | McKeown et al. |
| 6,484,161 | B1 | 11/2002 | Chipalkatti et al. |
| 6,487,545 | B1 | 11/2002 | Wical |
| 6,594,658 | B2 | 7/2003 | Woods |
| 6,651,058 | B1 | 11/2003 | Sundaresan et al. |
| 6,763,349 | B1 | 7/2004 | Sacco |
| 7,024,624 | B2 | 4/2006 | Hintz |
| 2001/0049674 | A1 | 12/2001 | Talib et al. |
| 2001/0049688 | A1 | 12/2001 | Fratkina |
| 2002/0022956 | A1 | 2/2002 | Ukrainczyk |
| 2002/0099700 | A1 | 7/2002 | Li |
| 2002/0133392 | A1 | 9/2002 | Angel et al. |
| 2002/0161608 | A1* | 10/2002 | Loveland ........................... 705/4 |
| 2002/0165849 | A1 | 11/2002 | Singh et al. |
| 2002/0174101 | A1 | 11/2002 | Fernley et al. |
| 2003/0018626 | A1 | 1/2003 | Kay et al. |
| 2003/0084066 | A1 | 5/2003 | Waterman |
| 2003/0088525 | A1* | 5/2003 | Velez et al. ................... 705/400 |
| 2003/0088554 | A1* | 5/2003 | Ryan et al. ....................... 707/3 |
| 2003/0101126 | A1* | 5/2003 | Cheung et al. .................. 705/37 |
| 2003/0115187 | A1 | 6/2003 | Bode |
| 2003/0115191 | A1 | 6/2003 | Copperman et al. |
| 2003/0126235 | A1 | 7/2003 | Chandrasekar et al. |
| 2004/0024739 | A1 | 2/2004 | Copperman |
| 2004/0236737 | A1 | 11/2004 | Weissman et al. |
| 2004/0243581 | A1 | 12/2004 | Weissman et al. |
| 2006/0064403 | A1 | 3/2006 | Rechterman et al. |

FOREIGN PATENT DOCUMENTS

| | | |
|---|---|---|
| WO | WO 00/79436 | 12/2000 |

OTHER PUBLICATIONS

'IndustryNet: A Model for Commerce on the World Wide Web': Jones, 1995, IEEE, 0885-90000, pp. 54-59.*

'The web as enabling technology for software development and distribution': Oreizy, Dec. 1997, IEEE internet computing, December p. 84-87.*

'Searching the world wide web': Knobblock, IEEE Expert, Feb. 1997, p. 8-14.*

'Searching the world wide web': Knoblock, 1997, IEEE, pp. 8-14.*

'WordNet: A lexical database for English': Miller, 1995, ACM, Communications of the ACM, Nov. 1995 vol. 38, No. 11, pp. 39-41.*

'Web advertising': McCandless, 1998, IEEE Intelligent systems, pp. 8-9.*

'Using WordNet and lexical operators to improve internet searches': Moldovan, 2000, IEEE 1089-7801, pp. 34-43.*

U.S. Appl. No. 09/493,701, filed Jan. 28, 2000, Weissman, et al.

"Applied Semantics Launches Contextual Targeting Pay-For-Performance Ad Serving Solution", Applied Semantics—Press Release, Oct. 21, 2002, pp. 1-2, http://www.appliedsemantics.com/ne/ne_pr_102102.html.

"Applied Semantics Launches News Series to Power Publishing", Applied Semantics, Inc.—Press Release, Aug. 13, 2002, pp. 1-2, http://www.appliedsemantics.com/ne/ne_pr_081302.html.

"Applied Semantics News Series," pp. 1-4, brochure, no date.

Chi et al. "Context Query in Information Retrieval", Proceedings of the 14$^{th}$ IEEE International Conference on Tools with Artificial Intelligence, IEEE Comp. Soc, vol. Conf. 14, Nov. 2002, pp. 101-106.

"CIRCA Technology Overview," Applied Semantics White Paper, Jul. 2001, pp. 1-10.

"CONVERA—Products; RetrievalWare," printed Oct. 30, 2003, http://www.convera.com/products/rw_precisions.asp.

Fellbaum, C., ed. "WordNet: An Electronic Lexical Database", Cambridge: The MIT Press, Mar. 1998, pp. 117-127, 285-303. P325.5. D38W67 1998.

Geller, M., "Quigo Signs Deal with Overture", *MediaDailyNews*, Aug. 13, 2003, pp. 1-3, http://www.mediapost.com/dtls_dsp_news.cfm?newsID=215196.

Koll, M.B., "Information Retrieval Theory and Design Based on a Model of the User's Concept Relations", Proceedings of the 3$^{rd}$ Annual ACM Conference on Research and Development in Information Retrieval, 1980, pp. 77-93.

"Ontology Usage and Applications", Applied Semantics Technical White Paper, Jul. 2001, pp. 1-15.

"Powerful Revenue Solutions for Online Publishers", Applied Semantics AdSense, pp. 1-2. brochure, no date.

Tengi, R.I., "Design and Implementation of the WordNet Lexical Database and Searching Software", in *WordNet: An Electronic Lexical Database*, Fellbaum C. ed., Cambridge: The MIT Press, Mar. 1998, pp. 105-127.

"Verity Introduces Customizable Industry and Enterprise Taxonomies", Verity, Nov. 17, 2003, pp. 1-2.

Voorhees, E.M., "Query Expansion Using Lexical-Semantic Relations", Proceedings of the 17$^{th}$ Annual ACM Conference on Research and Development in Information Retrieval, Aug. 1994, pp. 61-69.

Lin, Shian-Hua et al. Discovering Informative Content Blocks from Web Documents, Proceedings of the ACM SIGKDD International Conference on Knowledge Discovery and Data Mining, Jul. 23, 2002-Jul. 26, 2002, pp. 588-593, Edmonton, Alberta Canada.

International Search Report and the Written Opinion of the International Searching Authority, or the Declaration, Nov. 17, 2004, Google Inc.

International Preliminary Report on Patentability, Jan. 30, 2006, Google Inc.

Kerschberg, et al. "A Semantic Taxonomy-Based Personalizable Meta-Search Agent," Conference Proceedings Article, vol. 1. Dec. 3, 2001.

Voss, et a., "Concepts as Knowledge Handles in Colllaborative Document Management," Enabling Technologies: Infrastructure for Collaborative Enterprises, 1999.

Apted, et al., "Visualisation of Ontological Inferences for User Control of Personal Web Agents," Proceedings of the Seventh International Conference on Information Visualization (IV '03).

International Search Report for PCT/US04/023827, dated Dec. 21, 2004.

International Preliminary Examination Report for PCT/US04/023827, dated Jan. 30, 2006.

International Search Report PCT/US04/023828, dated Nov. 29, 2004.
International Preliminary Examination Report for PCT/US04/023828, dated Jan. 30, 2006.
Australian Office Action for Application No. 2004262302, dated Aug. 5, 2009, 2 pages.
Australian Office Action for Application No. 2004262303, dated Aug. 5, 2009, 3 pages.
Chinese Office Action for Application No. 200480021909.X, dated Oct. 12, 2007, 6 pages.
Chinese Office Action for Application No. 200480021909.X, dated Nov. 7, 2008, 11 pages.
Chinese Office Action for Application No. 200480021922.5, dated Oct. 26, 2007, 10 pages.
Japanese Office Action for Application No. 2006-521944, dated Aug. 14, 2007, 5 pages.
Japanese Office Action for Application No. 2006-521945, dated Jan. 12, 2010, 2 pages.
Brachman, R.J. and Schmolze, J.G. "An Overview of the KL-ONE Knowledge Representation System," Cognitive Science, vol. 9, 1985, pp. 171-216.
Budanitsky, A. and Hirst, G. "Semantic Distance in WordNet: An Experimental, Application-Oriented Evaluation of Five Measures," Proc. Of the North Amer. Association for Computational Linguistics, Word Net and Other Lexical Resources Workshop, Jun. 2-7, 2001, 6 pages.
Budanitsky, A. "Lexical Semantic Relatedness and its Application in Natural Language Processing," Technical Report CCRG-390, Computer Systems Research Group, University of Toronto, Aug. 1999, 156 pages.
Buckley, C. et al. "Automatic Query Expansion Using SMART: TREC-3," Proceedings of the Text Retrieval Conference (TREC 3). Nov. 1994, pp. 69-81.
Caudal, P. "Using Complex Lexical Types to Model the Polysemy of Collective Nouns within the Generative Lexicon," Proceedings of the Ninth International Workshop on Database and Expert Systems Applications, 1998, 21 pages.
Chakravarthy, A.S. and Haase, K.B. "NetSerf: Using Semantic Knowledge to Find Internet Information Archives," Proceedings the 18th Annual International ACM SIGIR Conference on Research and Development in Information Retrieval. Jul. 1995, pp. 4-11.
Collins, A.M. and Loftus, E.F. "A Spreading-Activation Theory of Semantic Processing," Psychological Review, vol. 82, No. 6, 1975, pp. 407-428.
Ferri et al. "Toward a Retrieval of HTML Documents Using a Semantic Approach," IEEE International Conference on Multimedia and Expo, vol. 3, 2000, pp. 1571-1574.
Meijs, W. "Inferring Grammar from Lexis: Machine-Readable Dictionaries as Sources of Wholesale Syntactic and Semantic Information," IEEE Colloquium on Grammatical Inference: Theory, Applications and Alternatives, 1993, pp. P3/1-P3/5, 6 pages.
Mihalcea, R. and Moldovan, D. "Semantic Indexing using Word Net Senses," Proceedings of the ACL Workshop on IR and NLP, Oct. 2000, pp. 35-45.
Rada, R. et al. "Development and Application of a Metric on Semantic Nets," IEEE Transactions on Systems, Man and Cybernetics, vol. 19, No. 1, Jan./Feb. 1989, pp. 17-30.
Resnick, P. "Semantic Similarity in a Taxonomy: An Information-Based Measure and its Application to Problems of Ambiguity in Natural Language," Journal of Artificial Intelligence Research, vol. 11, Jul. 1999, pp. 95-130.
Richardson, R., Smeaton, A. F. And Murphy, J. "Using Wordnel for Conceptual Distance Measurement," roc. of the 16th Research Colloquium of the BCS-I RSG, 1994, pp. 100-123.
Smeaton, A.F. And Quigley, I. "Experiments on Using Semantic Distances Between Words in Image Caption Retrieval," Proceedings of the 19th International Conference on Research and Development in Information Retrieval, Aug. 1996, pp. 174-180.
St-Onge, D. "Detecting and Correcting Malapropisms with Lexical Chains," M.S. Thesis, University of Toronto, Mar. 1995, pp. 1-62.
Sutcliffe, R.F.E. et al. "Beyond Keywords: Accurate Retrieval from Full Text Documents," Proceedings of the 2nd Language Engineering Convention, Oct. 16-18, 1995, 7 pages.
Sutcliffe, R.F.E. et al. "The Automatic Acquisition of a Broad-Coverage Semantic Lexicon for use in Information Retrieval," Proc of the AAAI Symp 'Representation and Acquisition of Lexical Knowledge: Polysemy, Ambiguity and Generativity, Mar. 27-29, 1995, pp. 163-167.

* cited by examiner

DETERMINING A MEANING OF A KNOWLEDGE ITEM USING DOCUMENT-BASED INFORMATION

CROSS-REFERENCE TO RELATED APPLICATION

This application is a related to U.S. patent application Ser. No. 09/493,701 filed Jan. 28, 2000 entitled "Meaning-Based Advertising and Relevance Determination," which is a continuation-in-part of U.S. Pat. No. 6,453,315 filed Nov. 1, 1999 entitled "Meaning-Based Information Organization and Retrieval," which claims priority to U.S. Provisional Patent Application Ser. No. 60/155,667 filed Sep. 22, 1999, all of which are hereby incorporated in their entirety by this reference, and this application claims priority to U.S. Provisional Patent Application Ser. No. 60/491,422 filed Jul. 30, 2003 entitled "Systems and Methods of Organizing and Retrieving Information Based on Meaning," which is hereby incorporated in its entirety by this reference.

FIELD OF THE INVENTION

The invention generally relates to knowledge items. More particularly, the invention relates to methods and systems for understanding meaning of knowledge items using information associated with the knowledge item.

BACKGROUND OF THE INVENTION

Two knowledge items are sometimes associated with each other through manual or automated techniques. Knowledge items are anything physical or non-physical that can be represented through symbols and can be, for example, keywords, nodes, categories, people, concepts, products, phrases, documents, and other units of knowledge. Knowledge items can take any form, for example, a single word, a term, a short phrase, a document, or some other structured or unstructured information. Documents include, for example, web pages of various formats, such as HTML, XML, XHTML; Portable Document Format (PDF) files; and word processor and application program document files. For example, a knowledge item, such as, content from a document, can be matched to another knowledge item, such as, a keyword or advertisement. Similarly, a knowledge item, such as, a document, may be associated with another document containing related content so that the two documents can be seen to be related.

One example of the use of knowledge items is in Internet advertising. Internet advertising can take various forms. For example, a publisher of a website may allow advertising for a fee on its web pages. When the publisher desires to display an advertisement on a web page to a user, a facilitator can provide an advertisement to the publisher to display on the web page. The facilitator can select the advertisement by a variety of factors, such as demographic information about the user, the category of the web page, for example, sports or entertainment, or the content of the web page. The facilitator can also match the content of the web page to a knowledge item, such as a keyword, from a list of keywords. An advertisement associated with the matched keyword can then be displayed on the web page. A user may manipulate a mouse or another input device and "click" on the advertisement to view a web page on the advertiser's website that offers goods or services for sale.

In another example of Internet advertising, the actual matched keywords are displayed on a publisher's web page in a Related Links or similar section. Similar to the example above, the content of the web page is matched to the one or more keywords, which are then displayed in the Related Links section, for example. When a user clicks on a particular keyword, the user can be directed to a search results page that may contain a mixture of advertisements and regular search results. Advertisers bid on the keyword to have their advertisements appear on such a search results page for the keyword. A user may manipulate a mouse or another input device and "click" on the advertisement to view a web page on the advertiser's website that offers goods or services for sale.

Advertisers desire that the content of the web page closely relate to the advertisement, because a user viewing the web page is more likely to click on the advertisement and purchase the goods or services being offered if they are highly relevant to what the user is reading on the web page. The publisher of the web page also wants the content of the advertisement to match the content of the web page, because the publisher is often compensated if the user clicks on the advertisement and a mismatch could be offensive to either the advertiser or the publisher in the case of sensitive content.

Various methods have been used to match keywords with content. Most of these methods have involved a form of text matching, for example, matching the keywords with words contained in the content. The problem with text matching is that words can relate to multiple concepts, which can lead to mismatching of content to keyword.

For example the term "apple" can relate to at least two concepts. Apple can refer to the fruit or the computer company by the same name. For example, a web page can contain a news story about Apple Computer and the most frequently used keyword on the web page, in this case "apple", could be chosen to represent the web page. In this example, it is desirable to display an advertisement relating to Apple Computer and not apple, the fruit. However, if the highest bidder on the keyword "apple" is a seller of apples and if the keyword "apple" is matched to the web page, the advertisement about apples, the fruit, would be displayed on the web page dealing with Apple, the computer company. This is undesirable, because a reader of the web page about a computer company is likely not also interested in purchasing apples.

Mismatching of knowledge items, such as keywords, to content can result in irrelevant advertisements being displayed for content. It is, therefore, desirable to understand the meaning of knowledge items.

SUMMARY

Embodiments of the present invention comprise systems and methods that understand the meaning of knowledge items using related information. One aspect of an embodiment of the present invention comprises receiving a knowledge item and receiving related information associated with the knowledge item. Such related information may include a variety of information, such as, related documents and related data. Another aspect of an embodiment of the present invention comprises determining at least one related meaning based on the related information and determining a meaning for the knowledge item based at least in part on the related meaning of the related information. A variety of algorithms using the related meaning may be applied in such systems and methods. Additional aspects of the present invention are directed to computer systems and computer-readable media having features relating to the foregoing aspects.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

The present invention comprises methods and systems for understanding the meaning of knowledge items using the knowledge item itself as well as information associated with the knowledge item. Reference will now be made in detail to exemplary embodiments of the invention as illustrated in the text and accompanying drawings. The same reference numbers are used throughout the drawings and the following description to refer to the same or like parts.

Figure 1:
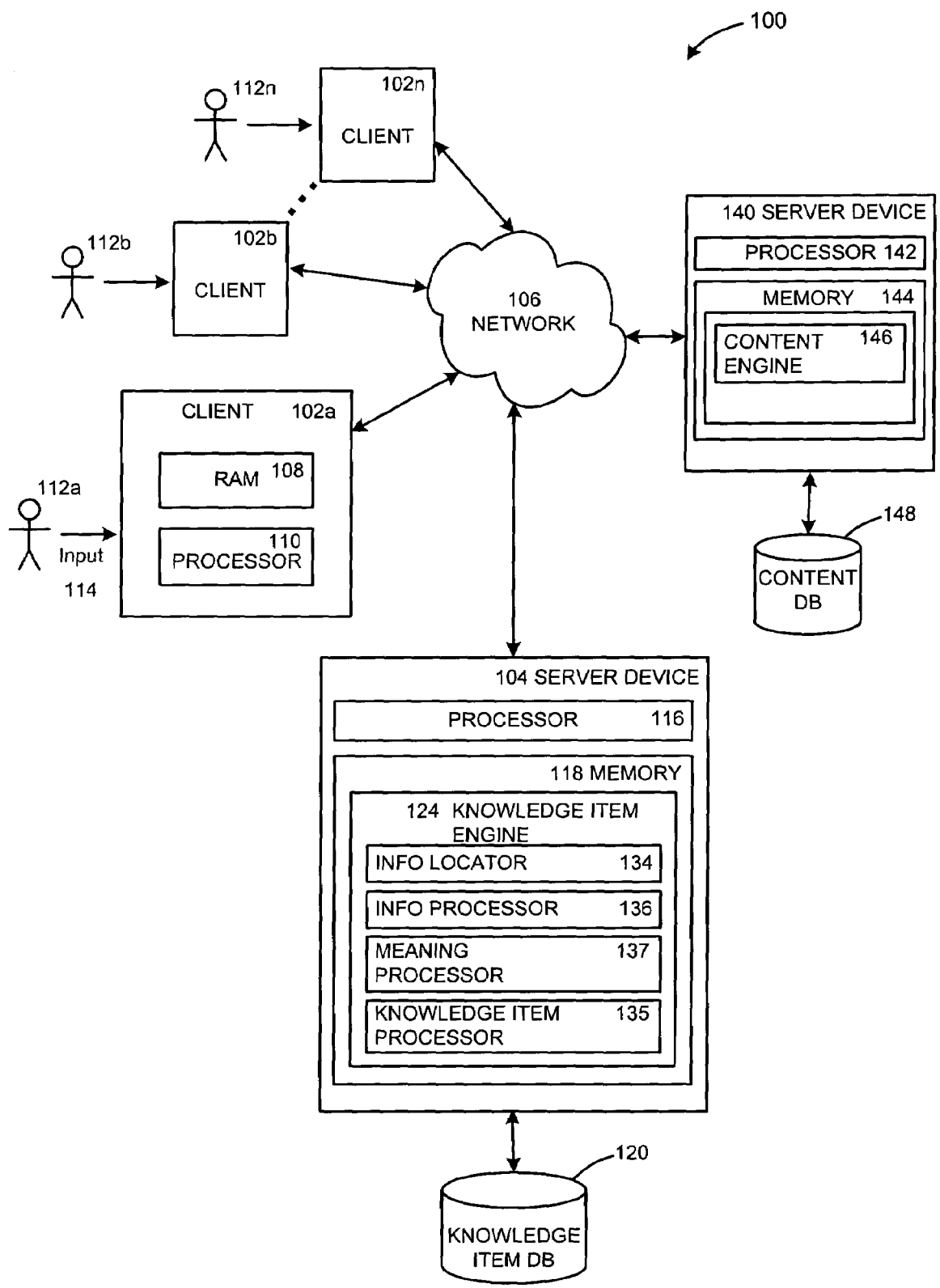
FIG. 1 illustrates a block diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

The system 100 shown in FIG. 1 includes multiple client devices 102a-n, server devices 104, 140 and a network 106. The network 106 shown includes the Internet. In other embodiments, other networks, such as an intranet may be used. Moreover, methods according to the present invention may operate in a single computer. The client devices 102a-n shown each include a computer-readable medium, such as a random access memory (RAM) 108, in the embodiment shown coupled to a processor 110. The processor 110 executes a set of computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, and JavaScript.

Client devices 102a-n may also include a number of external or internal devices such as a mouse, a CD-ROM, a keyboard, a display, or other input or output devices. Examples of client devices 102a-n are personal computers, digital assistants, personal digital assistants, cellular phones, mobile phones, smart phones, pagers, digital tablets, laptop computers, a processor-based device and similar types of systems and devices. In general, a client device 102a-n may be any type of processor-based platform connected to a network 106 and that interacts with one or more application programs. The client devices 102a-n shown include personal computers executing a browser application program such as Internet Explorer™, version 6.0from Microsoft Corporation, Netscape Navigator™, version 7.1 from Netscape Communications Corporation, and Safari™, version 1.0 from Apple Computer. Through the client devices 102a-n, users 112a-n can communicate over the network 106 with each other and with other systems and devices coupled to the network 106.

As shown in FIG. 1, server devices 104, 140 are also coupled to the network 106. The server device 104 shown includes a server executing a knowledge item engine application program. The server device 140 shown includes a server executing a content engine application program. Similar to the client devices 102a-n, the server devices 104, 140 shown each include a processor 116, 142 coupled to a computer readable memory 118, 144. Server devices 104, 140 are depicted as a single computer system, but may be implemented as a network of computer processors. Examples of server devices 104, 140 are servers, mainframe computers, networked computers, a processor-based device and similar types of systems and devices. Client processors 110 and server processors 116, 142 can be any of a number of well known computer processors, such as processors from Intel Corporation of Santa Clara, California and Motorola Corporation of Schaumburg, Ill..

Memory 118 of the server device 104 contains a knowledge item processor application program, also known as a knowledge item processor 124. The knowledge item processor 124 determines a meaning for knowledge items. Meaning can be a representation of context and can be, for example, a vector of weighed concepts or groups or clusters of words. The knowledge items can be received from other devices connected to the network 106, such as, for example, the server device 140.

The knowledge item processor 124 may also match a knowledge item, such as a keyword, to an article, such as, a web page, located on another device connected to the network 106. Articles include, documents, for example, web pages of various formats, such as, HTML, XML, XHTML, Portable Document Format (PDF) files, and word processor, database, and application program document files, audio, video, or any other information of any type whatsoever made available on a network (such as the Internet), a personal computer, or other computing or storage means. The embodiments described herein are described generally in relation to documents, but embodiments may operate on any type of article. Knowledge items are anything physical or non-physical that can be represented through symbols and can be, for example, keywords, nodes, categories, people, concepts, products, phrases, documents, and other units of knowledge. Knowledge items can take any form, for example, a single word, a term, a short phrase, a document, or some other structured or unstructured information. The embodiments described herein are described generally in relation to keywords, but embodiments may operate on any type of knowledge item.

Memory 144 of server device 140 contains a content engine application program, also known as a content engine 146. In one embodiment, the content engine 146 receives a matched keyword from the knowledge item engine 124 and associates a document, such as an advertisement, with it. The advertisement is then sent to a requester's website and placed in a frame on a web page, for example. In one embodiment, the content engine 146 receives requests and returns content, such as advertisements, and matching is performed by another device.

The knowledge item engine 124 shown includes an information locator 134, an information processor 136, a knowledge item processor 135 and a meaning processor 136. In the embodiment shown, each comprises computer code residing in the memory 118. The knowledge item processor 135 receives a keyword and identifies known information about the keyword. The known information may include, for example, one or more concepts associated with one or more terms parsed from the keyword. A concept can be defined using a cluster or set of words or terms associated with it, where the words or terms can be, for example, synonyms. For example, the term 'apple' may have two concepts associated with it—fruit and computer company—and thus, each may have a cluster or set of related words or terms. A concept can also be defined by various other information, such as, for example, relationships to related concepts, the strength of relationships to related concepts, parts of speech, common usage, frequency of usage, the breadth of the concept and other statistics about concept usage in language.

The information locator 134 identifies and retrieves related information associated with keywords. In the embodiment shown, the related information could include related documents and additional related data. The related documents could include the text of the advertisements and the destination web site from advertisers that have bid on a keyword. The additional related data could include other keywords purchased by the advertisers, search results on a keyword from a search engine, cost per click data on the advertisers, and data related to the success rate of the advertisements. Some of this information can be obtained, for example, from the server device 140. The information processor 136 processes the related information located by the information locator 134 to determine at least one related meaning for the located related information. This related meaning and the known information about the keyword are then passed to the meaning processor 137. The meaning processor 137 uses the known information about the keyword and the related meaning to determine the meaning of the keyword. Note that other functions and characteristics of the information locator 134, knowledge item processor 135, information processor 136, and meaning processor 137 are further described below.

Server device 104 also provides access to other storage elements, such as a knowledge item storage element, in the example shown a knowledge item database 120. The knowledge item database can be used to store knowledge items, such as keywords, and their associated meanings. Server device 140 also provides access to other storage elements, such as a content storage element, in the example shown a content database 148. The content database can be used to store information related to knowledge items, for example documents and other data related to knowledge items. Data storage elements may include any one or combination of methods for storing data, including without limitation, arrays, hashtables, lists, and pairs. Other similar types of data storage devices can be accessed by the server device 104.

It should be noted that the present invention may comprise systems having different architecture than that which is shown in FIG. 1. For example, in some systems according to the present invention, the information locator 134 may not be part of the knowledge item engine 124, and may carry out its operations offline. The system 100 shown in FIG. 1 is merely exemplary, and is used to explain the exemplary methods shown in FIGS. 2-3.

Various methods in accordance with the present invention may be carried out. One exemplary method according to the present invention comprises receiving a knowledge item, receiving related information associated with the knowledge item, determining at least one related meaning based on the related information, and determining a knowledge item meaning for the knowledge item based at least in part on the related meaning of the related information. The related information may be associated with the knowledge item in any way, and determined to be related in any way. The related information may comprise related articles and related data. Some examples of related articles comprise an advertisement from an advertiser who has bid on a knowledge item and a web page associated with the advertisement. The knowledge item can be, for example, a keyword. An example of related data comprises cost per click data and success rate data associated with the advertisement. In one embodiment, the knowledge item meaning may comprise a weighted vector of concepts or related clusters of words.

In one embodiment, the knowledge item is processed after it is received to determine any known associated concepts. A concept can be defined by a cluster or group of words or terms. A concept can further be defined by various other information, such as, for example, relationships to related concepts, the strength of relationships to related concepts, parts of speech, common usage, frequency of usage, the breadth of the concept and other statistics about concept usage in language. In one embodiment, determining the knowledge item meaning comprises determining which of the associated concepts represents the knowledge item meaning.

In one embodiment, the knowledge item comprises a plurality of concepts and the related meaning comprises a plurality of concepts and determining the knowledge item meaning comprises establishing a probability for each knowledge item concept that the knowledge item should be resolved in part to the knowledge item concept, determining a strength of relationship between each knowledge item concept and each related meaning concept, and adjusting the probability for each knowledge item concept based on the strengths. In one embodiment, the knowledge item has a plurality of concepts and a plurality of related meanings are determined, where each related meaning has a plurality of concepts. A knowledge item meaning determination involves establishing a probability for each knowledge item concept that the knowledge item should be resolved in part to the knowledge item concept and establishing a probability for each related meaning concept that the knowledge item should be resolved in part to the related meaning concept.

Figure 2:
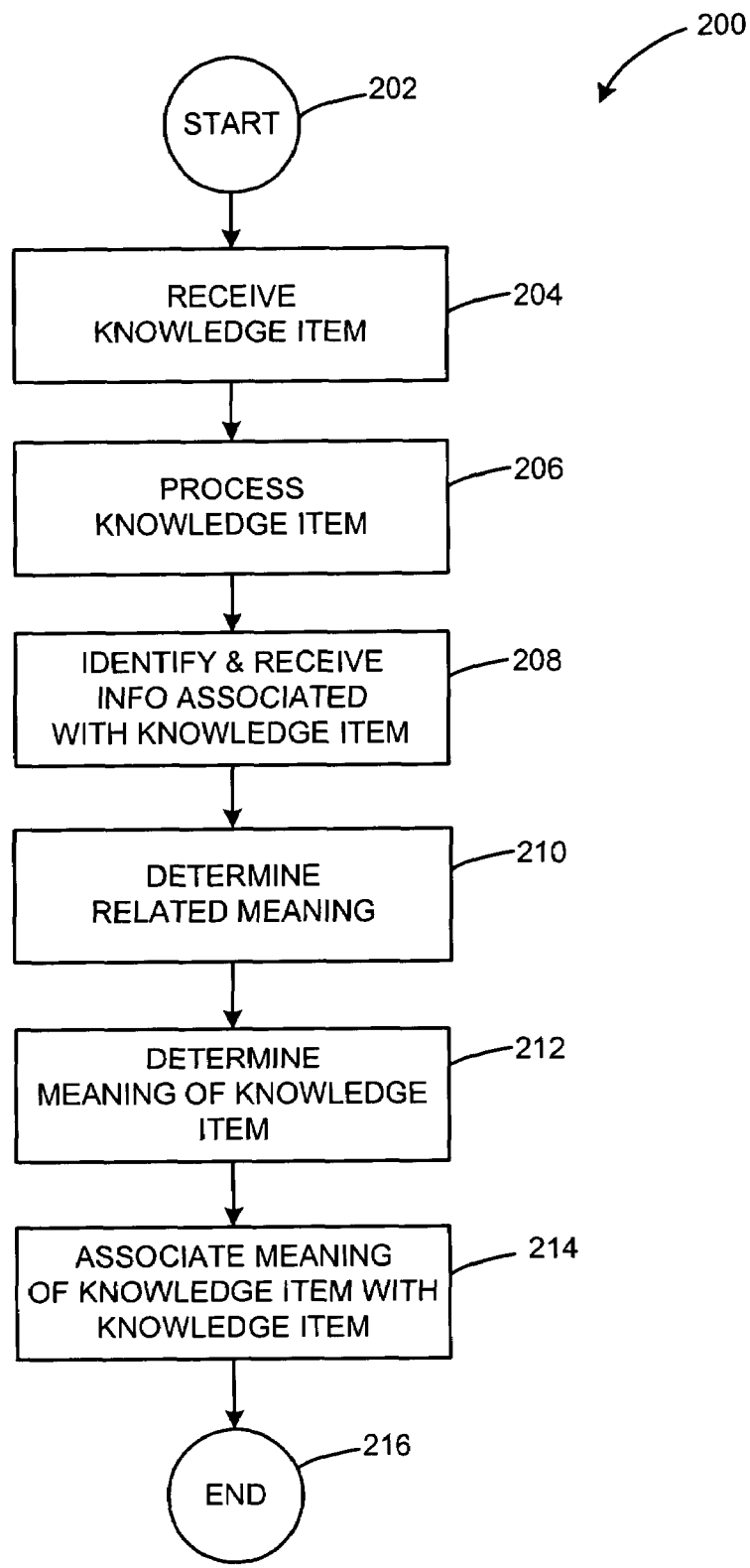
FIG. 2 illustrates a flow diagram of a method in accordance with one embodiment of the present invention.
Figure 3:
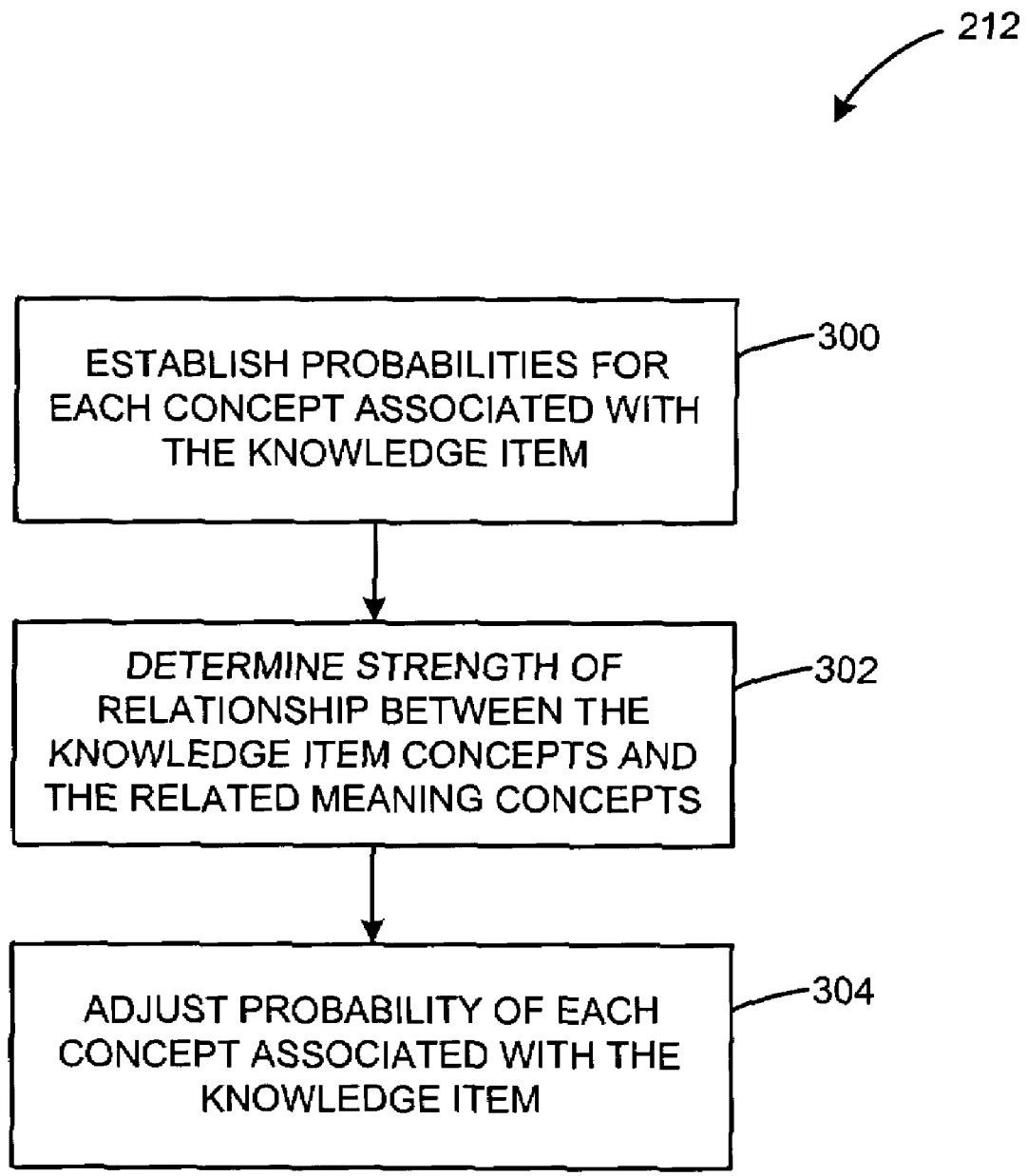
FIG. 3 illustrates a flow diagram of a subroutine of the method shown in FIG. 2.

FIGS. 2-3 illustrate an exemplary method 200 in accordance with the present invention in detail. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIGS. 2-3. The method 200 shown provides an understanding of the meaning of a keyword using information associated with the keyword.

Each block shown in FIGS. 2-3 represents one or more steps carried out in the exemplary method 200. Referring to FIG. 2, in block 202, the example method 200 begins. Block 202 is followed by block 204 in which a keyword is received by the knowledge item engine 124. The keyword can for example, be received from an external database through network 106, such as the content database 148 or can be received from other sources.

Next in block 206, the keyword is processed by knowledge item processor 135 to determine known information about the keyword. For example, the keyword may have one or more concepts associated with it. Each concept may have an associated cluster or group of words. A concept can also be defined by various other information, such as, for example, relationships to related concepts, the strength of relationships to related concepts, parts of speech, common usage, frequency of usage, the breadth of the concept and other statistics about concept usage in language.

For example, for the term apple there may be two possible associated concepts. The first concept of apple the fruit can be defined with relationships to related words or concepts, such as, fruit, food, pie, and eat. The second concept of apple the computer company can be defined with relationships to related words or concepts, such as, computer, PC, and technology. A keyword can be a short phrase, in which case, the phrase can be broken down by the knowledge item processor 135, for example, into individual terms. In such example, the knowledge item processor 135 can further determine concepts associated with each term. In some embodiments, the keyword will not have any information associated with it.

Block 206 is followed by block 208 in which related information associated with the keyword is identified by the information locator 134 and received by the information processor 136. The related information can include documents, such as, the text of advertisements and destination websites from advertisers who have bid on a keyword, web search results on the keyword itself, and related data, such as, other keywords bid on by the advertisers, the cost per click that the advertisers associated with the keyword are paying, the number of times a user has bought an item after clicking through an associated advertisement to an advertiser's website. This related information can be located from a variety of sources, such as, for example, the server device 140, the advertiser's websites, and search engines.

Block 208 is followed by block 210, in which the at least one related meaning is determined from the related information by the information processor 136. For example, for each individual related document a meaning could be determined or an overall meaning for all of the documents could be determined. For example, if the documents include the text of five advertisements associated with the keyword, a related meaning for each advertisement could be determined or the meanings of all five advertisements could be combined to provide an overall related meaning. In one embodiment, documents are processed to determine a vector of weighted concepts contained in the documents. The vector of weighted concepts can represent the meaning of the document. For example, if the advertisement relates to selling Apple Computers, the meaning of such an advertisement may be fifty percent computers, thirty percent Apple Computers and twenty percent sales. The related data can be used, for example, to adjust the weights of the meanings of individual documents or of the overall related meaning. Alternatively, the meaning of a document could be related clusters of words.

An example technique for determining the meaning of the document is sensing using word sense disambiguation. Before word sense disambiguation and sensing are applied to a document, the following components are used to prepare for meaning analysis: a Tokenizer, a Syntactic Category (part of Speech) Tagger, a Named Entity Recognition and Regular Pattern Identification Module, and a Term Segmenter.

The Tokenizer is responsible for splitting raw data into individual tokens, and for recognizing and marking sentences. This includes handling specific formatting information represented in the document text (for instance, as might appear in HTML tags), as well as identifying specific types of tokens, such as numbers, punctuation, and words. The Tokenizer maintains specific information about the original text, such as a token's byte offset, while stripping some data out (e.g. unnecessary tags), breaking apart some white-space delimited tokens (e.g. pulling a period at the end of a sentence out into a separate token from the word it is adjacent to), or adding some structure to the input text (e.g. sentence annotations). If spell checking is enabled, tokens that are not identified may be matched to correctly spelled candidates, based on the statistical likelihood of the type of error.

When the input contains multiple tokens that are not clearly separated, additional token segmentation processing occurs. World Wide Web domain names are a common example of this type of input. This token segmentation process uses statistical information in order to correctly interpret the domain name "thesearch.com" as a run-together version of: "the search", as opposed to the less likely interpretation: "these arch."

The Part of Speech Tagger analyzes a series of tokens making up a sentence and assigns a syntactic category tag to each token. The Tagger operates on contextual rules that define possible category sequences. The tokens in the series are initialized with the most probable tags for the token as derived from the token data in an Ontology. The tag given to each token can be changed based on the categories around that token. The part of speech data is used during the disambiguation to bias particular meanings of words. For instance, the word "branches" can be either a noun or a verb, and has different meanings in each case ("branches of a tree" vs. "The conversation branches out to ..."). Knowing its part of speech in a specific context narrows down the meanings that are possible.

The Named Entity Recognition and Regular Pattern Identification Module, is responsible for identifying a series of tokens that should potentially be treated as a unit, and that can be recognized as corresponding to a specific semantic type. This module recognizes email addresses, URLs, phone numbers, and dates as well as embodying heuristics for identifying "named entities" such as personal names, locations, and company names. Each recognized unit is marked as a term, and associated with a certain probability that the series should be treated as a unit. In the case of terms that already exist in the Ontology, this probability comes from the system's previous observations of that term. Reference resolution also comes into play at this stage, making it possible, for example, to correctly interpret references to "Mr. Bush" in a document, when the more ambiguous single token "Bush" is used subsequently.

The Term Segmenter goes through the tokens and maps single tokens or sequences of tokens to the terms represented in the Ontology. Competing terms—terms that overlap on one or more tokens—are each given a probability with respect to their competitors.

For instance, for a token sequence "kicked the bucket", there is some probability that the phrase should be treated as a unit (a multi-token term meaning "to die"; "Grandpa kicked the bucket last year"), and some probability that the phrase should be treated as a series of three individual terms (as in, "The toddler kicked the bucket and all the water poured out"). As in other cases, these relative probabilities are determined by the Term Segmenter based on previous observations of those terms. Once each potential term has been identified and labeled, we have access to the potential meanings associated with each term, and the individual probabilities of those meanings relative to the term as represented in the Ontology.

When these pre-processing steps have been completed, the resulting text can be viewed as a series of probabilistic sets of meaning sets, where each set of meaning sets corresponds to the individual meanings of a particular term. The job of the word sense disambiguation algorithm is then to look at the context established by the juxtaposition of particular terms and meanings in the input text in order to modify the initial context-free probabilities of the meanings into context-dependent probabilities. The result of the application of the algorithm is that the intended meanings of ambiguous words in context should be assigned the highest probability.

Once the above components have processed the document, word sense disambiguation can be performed. The idea underlying the word sense disambiguation algorithm is to utilize known semantic relationships between concepts, as represented in the Ontology, to increase the probability of a particular sense of a word in context -the more words that exist in the context that are related to a particular sense of a word, the more likely that particular sense should be. This follows from the notion of coherence in text, in that a speaker / writer will tend to use related concepts in a single context, as an idea is elaborated or relationships between entities identified.

The methodology used might be described as activation spreading—each meaning in the document sends a "pulse" to the meanings close by in the document that they are related to or associated with. This pulse is used to increase the probability of those meanings. The size of the pulse is a function of the strength of the relationship between the source concept and the target concept, the "focus" of the source concept— that is, how indicative of related concepts a concept can be considered to be (see below)—a measure of term confidence that reflects how confident the system is in the probabilities associated with the meanings of a given term, and potentially the probabilities of the source and target concepts.

The notion of focus is roughly analogous to the specificity of a concept, in that more specific concepts tend to be strongly related to a small set of things, and is somewhat inversely proportional to frequency, since more frequent concepts are less useful for discriminating particular contexts. However, focus is not directly based on either of those notions. For instance, "Microsoft" refers to a highly specific concept that nevertheless has quite low focus, because its presence in any given document is not highly indicative of that document being about the company or even the domain of computer technology. On the other hand, a very rare term like "thou" also would have quite low focus—although it is rare, it does not strongly influence the interpretation of the words it appears with.

We consider each of the competing terms, and each of their competing meanings, in parallel—each meaning is allowed to influence the surrounding meanings, proportional to their overall probability. This allows meanings that may have a low a priori probability to nevertheless boost particular senses of words around it, so that the context can push a low probability meaning to the top. Several pulsing cycles, in which all the meanings in the document are allowed to spread "activation" to their related meanings, are applied in order to reach a stable state of disambiguation. At each cycle, meanings are boosted, so that the most likely meanings are reinforced several times and end up with the highest probability.

Figure 6:
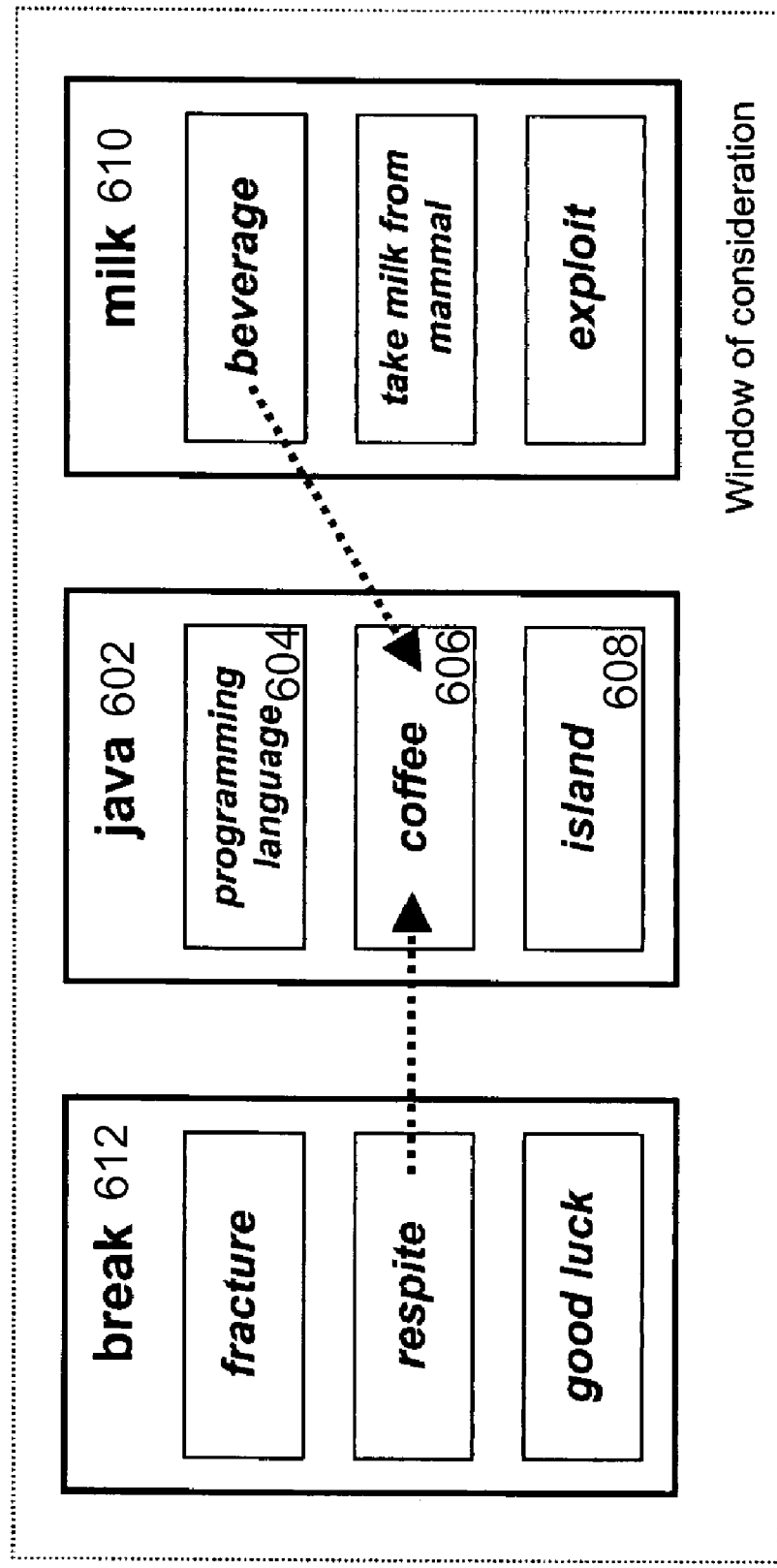
FIG. 6 illustrates an example application of the disambiguation algorithm

FIG. 6 illustrates an example application of the disambiguation algorithm. Consider the example of the term "Java" 602. "Java" has three possible meanings: "programming language" 604, "coffee" 606, or "an island in Indonesia" 608. Each of the three meanings of this term is initialized with a certain a priori probability that reflects the context-neutral probability of the term. Let's assume that the "programming language" 604 sense of the term is the most likely. When we look at the term in a context in which words such as "milk" 610 and "break" 612 appear, as shown in FIG. 6, we find that only the "coffee" 606 meaning is reinforced. This is because there are no relationships between the meanings of the terms around "Java" in either the "programming language" 604 or "island" 608 senses. Through the reinforcement of the "coffee" 606 meaning, and the lack of reinforcement of the other meanings, we will find that the overall probability of the "coffee" 606 meaning will become greater than the other meanings. This can then be viewed as the most likely disambiguation of the term "Java" 602 in that context.

After the application of the word sense disambiguation algorithm, the context-specific probability of each meaning for each term in the input text will be established. This provides a local, term-level view of the meanings conveyed by the text.

However, we would also like to establish a global view of the meaning of the text—a representation of the most important concepts expressed in the text. This has been termed sensing. To achieve this, the system builds on the results of the word sense disambiguation processing, again using semantic relationships as recorded in the Ontology to drive the identification of relevant concepts.

In this case, the goal is to identify the most prominent concepts in the text. This can be viewed as an analogous problem to the problem of identifying the most prominent meaning of a term, moved up from the term level to the document level. As such, the algorithm makes use of the same notion of reinforcement of meanings that the word sense disambiguation algorithm applies.

Related concepts that co-occur in the input text reinforce one another, becoming evidence for the importance of a concept. Implicitly, the algorithm incorporates the notion that more frequent concepts are more important, because concepts that occur more often will be reinforced more often. But unlike many approaches to automated metatagging, this is based solely on data at the semantic level, rather than at the term level.

In approaching the meaning of longer input texts, certain properties of documents are accommodated. In particular, a document may contain sections that are only tangentially related to the main topics of the document. Consider, for example, an HTML document constructed from frames. The "sidebar" frames normally contribute little to the intended interpretation of the document in the "main" frame. Rather than handling this as a special case, it makes sense to treat this as a generic problem that can occur in documents. This is because it often occurs that an author of a document includes something as an aside, without intending it to contribute to the main point, or because of conventions in certain domains, such as the "Acknowledgements" section of academic papers or the "Author bio" section of some magazine articles.

Such sections can interfere with sensing, reinforcing concepts that contribute little to the overall meaning. Furthermore, a document may contain several main points that are addressed in different sections of the document. The algorithm should identify both concepts that are important overall (i.e. recurrent themes of the document), and concepts that are discussed in depth in one portion of the document, but not reinforced in other sections.

Sensing in this case is therefore based on a view of a document as a series of regions. Each region is identified on the basis of certain heuristics, including formatting information. In general, these regions will be larger than the window considered during the sense disambiguation of any given term in the document. Concepts within a region reinforce one another by "pulsing" across ontological relationships between them (proportional to the probability of the concept, derived from the word sense disambiguation, and the strength of the relationship). The most strongly reinforced concepts are selected as the most representative concepts of the region.

The representative concepts across regions in the document are then calculated by considering only the most representative concepts of each region, and allowing them to reinforce one another. At the end of this cycle, a ranked list of meanings important to the document will be produced.

Finally, the relevance of each region to the overall meaning of the document is evaluated, and regions judged to have little relevance (because they do not contain many instances of concepts judged to be most important) are thrown out, and the representativeness of concepts across only the remaining regions is re-calculated. The effect of this is that the main concepts expressed in the document are judged on the basis of only those regions of the document that seem to carry the most semantic weight with respect to those main concepts.

When the text input is short, in the case of a user query to a search engine, for example, a modified form of this sense processing occurs. The "regions" of text used for longer inputs do not exist and therefore cannot be relied on to support an interpretation. Though there is less evidence to rely on, there is a benefit to having a short input: it is possible to explore all potential meanings of an input separately.

For example, when the word "Turkey" appears in a long document, one interpretation of the word will likely dominate as a result of disambiguation and sensing (say, either the bird meaning, or the country meaning). However, if the entire input text is the word "Turkey", the ambiguity of the input can be preserved, and both interpretations passed on to subsequent processing. The huge number of possible permutations of meaning for longer documents makes this infeasible when they are used as the input.

The process results in a ranked list of meanings most representative of the document.

Block 210 is followed by block 212, in which the meaning of the keyword is determined based on the related meaning or meanings by meaning processor 137. Meaning processor 137 receives the related meaning or meanings from information processor 136 and the processed keyword from knowledge item processor 135. For example, in block 212, the meaning processor would receive the keyword apple and its related two concepts from the knowledge item processor and would receive the related meaning of the advertisement for Apple Computers from the information processor 136. A variety of methods could be used to determine the meaning of the keyword based on the related meaning or meanings received from the information processor 136. For example, the related meaning can be used as a clue to determine the best concept to associate with the keyword to provide a meaning for the keyword. Where the related meaning is, for example, fifty percent computer, thirty percent Apple Computers and twenty percent sales the relationship between the weighted concepts of the related meaning and the concepts of the keyword could be used to indicate that the keyword apple should be associated with the concept of the computer company. Alternatively, the related meaning or meanings and related data can be used to develop a new meaning for the keyword.

Any one or more of a variety of related information may be used to determine the meaning of a keyword. The examples of related information that may be used to determine the meaning of a keyword include, without limitation, one or more of the following:

The text of advertisements associated with advertisers who have currently bid on the knowledge item.

The destination web page or web pages for the advertisements.

Text of advertisements from advertisers who have in the past bid on the keyword.

Other keywords bid on by the advertisers who currently have bid on the keyword.

Search results on the keyword from a search engine.

The number of people who have bought an item, after viewing the advertisement, from an advertiser's website that is associated with the keyword.

There are a variety of other related information that may be included, and these are only examples. Moreover, this related information may be given different weights depending on some of the information. For example, the text of advertisements of current advertisers may be weighted more than the text of advertisements of former advertisers associated with the keyword. Further, the items associated with the advertiser with the highest cost per click may be weighted more based on the cost per click.

FIG. 3 illustrates an example of a subroutine 212 for carrying out the method 200 shown in FIG. 2. The subroutine 212 determines the meaning of the keyword using a related meaning or related meanings. An example of subroutine 212 is as follows.

The subroutine begins at block 300. At block 300, probabilities for each set of words associated with the keyword are established. For example, in one embodiment each keyword can comprise one or more terms and each term can have one or more concepts associated with it. For purposes of this example, the keyword comprises a single term with at least two related concepts. In block 300, each concept associated with the keyword is given an a priori probability of the keyword being resolved to it. This a priori probability can be based on information contained in a network of interconnected concepts and/or on previously collected data on the frequency of each term being resolved to the concept.

As the set possible meanings is being compiled, probabilities are assigned to each. These values reflect the likelihood that the user really means a certain concept. Because many words have multiple meanings, probabilities for implied meanings for words may be manually preassigned. These values are used in this phase of the engine processing, in order to estimate what meanings are most likely implied by particular search words. Other factors that affect the probabilities given to meanings are: was the meaning matched by a morphed word or the word in its "pure" form (favor pure forms); was the meaning only partially matched the input word(s) (if so, reduce probability); was the meaning the result of a match on multiple words (if so, increase probability); the commonness of the meaning implied (favor more common meanings).

Another kind of "concept induction" is applied to the analysis at this point. All implied meanings are examined and compared against each other, so that relationships might be discovered. If there is a connection between two meanings, those meanings will receive a bonus to their probability factor, because the implication is that those particular meanings of the user's words were what the user wanted (these comparisons actually occur between the all the meanings that are possibilities for one search word against all those for each other search word). Thus if the user enters "Turkey Poultry", the meaning of "turkey" as a kind of food will receive a bonus, because a connection between a meaning deriving from "poultry" relates to this particular meaning of "turkey". This is extremely valuable in tuning meaning probabilities, because without this weighting, for example, the meaning "Turkey, the country" might have been preferred.

Meaning-based advertising may be achieved by placing or indexing ads within the semantic space. As with documents indexed into semantic space, advertisements may be indexed or placed within the semantic space according to their targeted meaning. For instance, an advertisement from a desktop and laptop computer retailer might be indexed at/near a synset for personal computer. This places the advertisement into semantic space such that it would be retrieved according to an input that has a semantic "subspace" that includes the advertisement's location. An advertisement such as an internet banner ad can thus be accessed or retrieved not merely by keyword or category, but rather by a semantic concept that may encompass many words, equivalent words and words of related meaning.

For instance, the computer retailer in the above example would be able to place the ad into the synset corresponding to personal computers. By doing so, a search engine or mechanism that utilizes this semantic space may sell the concept of "personal computer" to the advertiser. Instead of a keyword or even multiple keywords the purchase of a concept such as "personal computer" may be much more valuable to the advertiser and the potential viewer of the ad. Input words such as "PC", "laptop" "desktop" and "workstation" would be related closely with one another and thus fall in close proximity to one another. As a result, an input of any of these words to a search engine or filter would result in retrieval of the same banner ad. Further, depending on the radius of semantic distance used to define the sub-space from the synset "personal computer", many other less closely associated words (meanings) may also trigger retrieval of the same advertisement. For instance, the word "hardware" in one of its meanings indicates devices that are used in a computing or communications environment. While "hardware" is not equivalent to "personal computer," within a semantic space, "personal computer" may be related to the synset for "hardware" as a type of "hardware" and fall close enough in semantic distance such that an input of hardware might retrieve the same advertisement as would an input of "personal computer".

Figure 5:
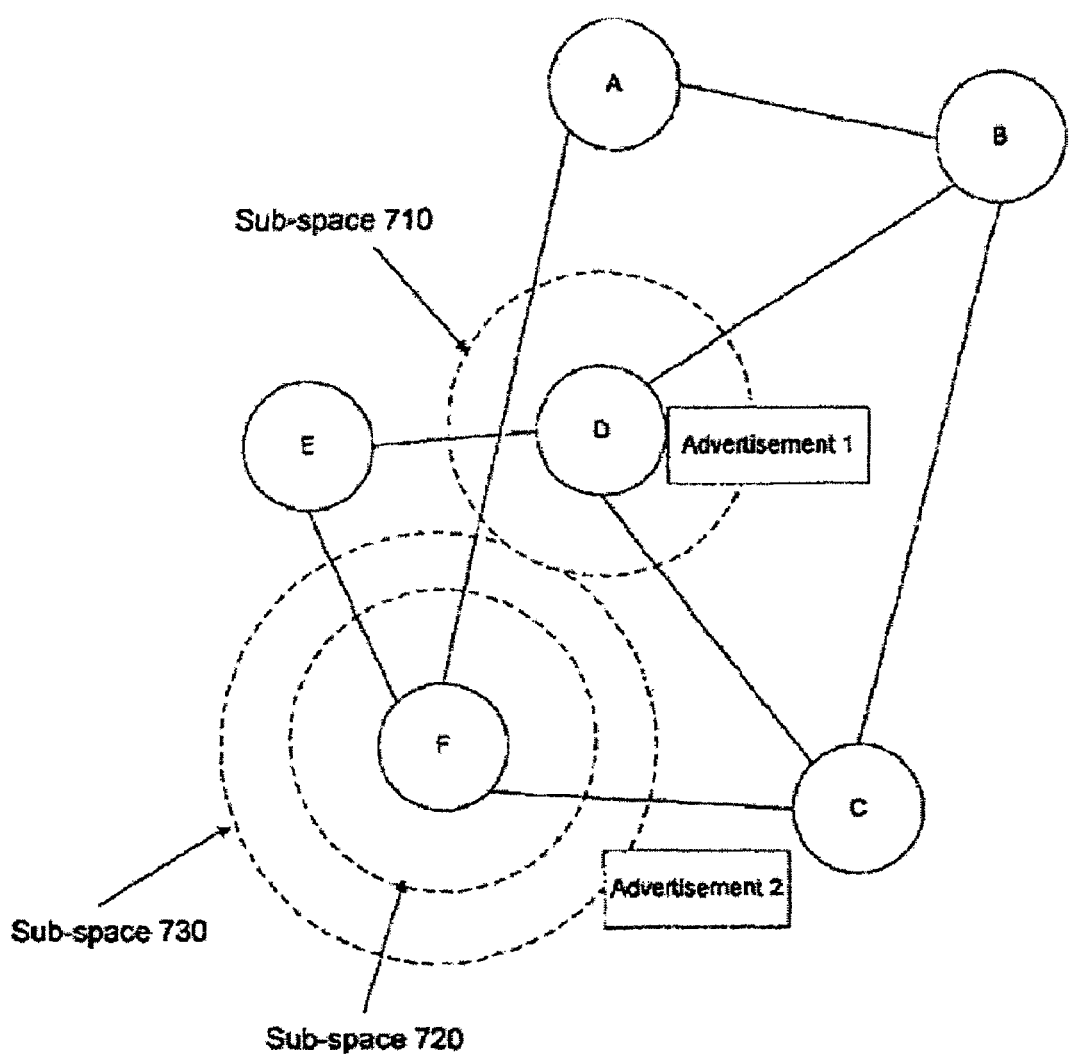
FIG. 5 illustrates advertisements indexed within a semantic space.

FIG. 5 illustrates advertisements indexed within a semantic space.

The semantic space 700 of FIG. 5 includes six nodes or synsets A, B, C, D, E, and F. The semantic space 700 is illustrated for convenience as a two dimensional space with connections between various nodes showing their interrelationship. An actual semantic space may be thought of has having N-dimensions, given the complex possible associations between synsets, words, subjects and meanings. In general, the further away one location in the space from another, the less related or associated the nodes are semantically. There are two advertisements, Advertisement 1 and Advertisement 2 indexed within the shown semantic sub-space at various locations. This positioning of documents such as advertisements may be made manually or by some automated process.

Several semantic sub-spaces are shown. These sub-spaces are triggered by an input of a term or meaning that equates to a synset. A user or mechanism inputting a term that is associated with the node D will generate a semantic sub-space 710. With sub-space 710 thus defined, an ad, Advertisement 1, is found immediately. Semantic sub-space 710 is a "first" semantic sub-space which is an initial guess at a given semantic radius about the node D. In this case, an advertisement was discovered contained therein without any expansions of the space. Consequently, taking the example of a search engine portal website, a user visiting that website that enters a term equivalent to the node D would trigger retrieval of Advertisement 1.

By contrast, a first semantic sub-space 720, determined by an input term associated with node F, contains no advertisements to retrieve. As a consequence, in one embodiment, the semantic radius about the node F may be increased until an ad is found. In this instance, the semantic radius about node F was increased to give an expanded sub-space 730. The semantic sub-space 730 contains Advertisement 2. Thus, subject to an expansion from the first semantic sub-space 720, a user entering in a search term associated with node F will retrieve Advertisement 2. Unlike traditional keyword advertising, input of related meanings may also retrieve the same Advertisement 2. For instance, an input term associated with node C would likely also retrieve Advertisement 2, since both node C and F are related or connected concepts.

Block 300 is followed by block 302, in which the strength of the relationship is determined between the keyword concepts and the related meaning or meanings concepts. For example, in one embodiment the related meaning may be comprised of a weighed set of concepts. A strength is determined for the relationship between each keyword concept and each related meaning concept. The weight of each related meaning concept can be used to adjust the strength of the relationship between the related meaning concepts and the keyword concept. The strength can reflect the probability of co-occurrence between concepts, or some measure of closeness of the two concepts, which can be derived from ontological data.

Block 302 is followed by block 304, in which the strengths computed in block 302 are used to adjust the probability of the keyword being resolved to each of its associated concepts. For example, the strengths determined for the relationship between each keyword concept and each related meaning concept are used to adjust the probability of each keyword concept being considered. In one embodiment, after the probabilities for the keyword concepts have been adjusted, the probabilities are normalized to one. The steps occurring in blocks 302 and 304 can be repeated a number of times to boost the impact of the strengths of the relationships on the probabilities.

In one embodiment, the keyword can comprise multiple concepts and multiple related meanings may each comprise multiple concepts. In this embodiment, the keyword meaning can be determined by establishing a probability for each keyword concept that the keyword should be resolved in part to the keyword concept and a probability for each related meaning concept that the keyword should be resolved in part to the related meaning concept. These probabilities can be established in the manner described above with respect to FIG. 3.

Returning now to FIG. 2, block 212 is followed by block 214 in which the meaning of the keyword is associated with the keyword and stored. The keyword and its associated meaning could be stored together, for example, in the knowledge item database 120, or could be stored separately in separate databases.

Figure 4:
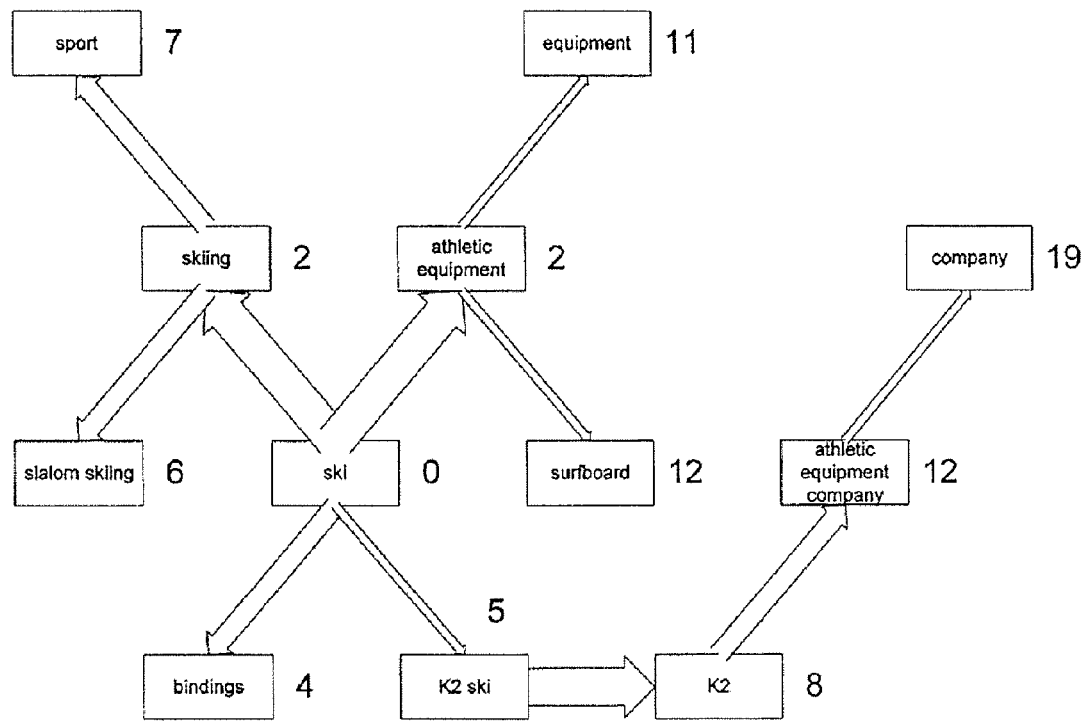
FIG. 4 illustrates the concept of bond strength and semantic distance in one or more embodiments of the invention.

FIG. 4 illustrates the concept of bond strength and semantic distance in one or more embodiments of the invention.

Using an exemplary lexicon, FIG. 4 illustrates how distance and closeness of meaning between meanings can be quantified within the semantic space. Distances are shown between the element "ski" and all other elements within the semantic space. Using three classes of bond strengths the degree of closeness between meanings may be discovered. A "strong relationship" exists between "ski" and "skiing" as does between "ski" and "athletic equipment." Between "skiing" and "sport" there is a weaker than strong relationship known as a "medium Relationship". This is because when you think of the root term "skiing" one doesn't quickly think also of "sport". Going from "ski" to "skiing" however, the average person would more likely associate or think "skiing" if given the term "ski". The direction in the arrows in the bond strengths, indicates the direction of association. "A→B" in FIG. 4 means that if you are given A, how likely is it or closely would one associate the meaning B. Going the other direction between the same two elements may produce a different bond strength. A "weak relationship" would be displayed between "ski" and "K2 ski" (when you think of "ski," "K2 ski" doesn't closely come to mind). However, if one were to go from "K2 ski" to "ski" this might be construed as a strong relationship since one would naturally associate "ski" if given "K2 ski".

FIG. 4 also shows semantic distances between elements. "Ski" and "skiing" have only a distance of 2 between them while "skiing" and "sport" have a distance of 5 (7–2). The distance between "ski" and "sport" is 7. When traveling from parent to child or vice-versa, the distances can be simply added/subtracted but when changing the direction of travel, a penalty may be imposed upon the distance calculation. Take for example the distance between "ski" and "athletic equipment company". Judging merely on a linear basis, the distance might be 12. But since the path from "ski" to "athletic equipment" switches direction twice (it starts down to "K2 ski" and then across the lateral bond to "2" and then up to "athletic equipment company") a penalty or scaling factor would cause the distance between "ski" and "athletic equipment" to be much larger than 5 just 12 especially given their lack of connectedness. As described above penalties may be added when the direction of traversal is switched or when a lateral bond is crossed. Meaning-by-meaning, distances between elements may be calculated and stored for future use in search retrieval.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method performed by a computer system including one or more servers, the method comprising:
   receiving data identifying a knowledge item;
   retrieving, from a database, document-based information to be used in selecting a meaning for the knowledge item, where the document-based information comprises one or more documents related to the knowledge item;
   determining one or more document term meanings of the document-based information, the determining comprising, for each document in the document-based information;
      selecting one or more meanings for terms in the document from meanings associated with the terms in a computer-readable data collection that associates at least one meaning with each of the terms, and then determining one or more document term meanings of the document from the one or more meanings for the terms in the document;
   determining a plurality of knowledge item term meanings of the knowledge item by selecting a plurality of meanings from meanings associated with one or more terms of the knowledge item in the computer-readable data collection;
   determining a strength of relationship between each knowledge item term meaning and each document term meaning of the document-based information, and determining a respective selection probability for each knowledge item term meaning from the strengths;
   designating a knowledge item term meaning from the plurality of knowledge item term meanings as a meaning of the knowledge item according to the respective selection probability associated with each knowledge item term meaning; and
   storing the designated meaning of the knowledge item.

2. The method of claim 1, wherein the knowledge item includes a keyword received as input to a search engine.

3. The method of claim 1, wherein the document-based information comprises an advertisement from an advertiser who has bid on the knowledge item.

4. The method of claim 3, wherein the document-based information further comprises a destination web page associated with the advertisement.

5. The method of claim 4, wherein the document-based information further comprises related data.

6. The method of claim 5, wherein the related data comprises cost per click data associated with the advertisement.

7. The method of claim 1, wherein the plurality of knowledge item term meanings are each represented as an associated concept and wherein selecting the knowledge item term meaning comprises selecting at least one of the associated concepts.

8. The method of claim 1, further comprising:
   establishing an initial probability, for each of the plurality of knowledge item term meanings, that the knowledge item be resolved to the one of the plurality of knowledge item term meanings,
   wherein the selection probabilities are further based on the initial probabilities.

9. The method of claim 1, wherein the knowledge item term meaning comprises a weighted vector of concepts.

10. The method of claim 1, wherein the knowledge item term meaning comprises a related cluster of words.

11. The method of claim 1, wherein determining one or more document term meanings further includes:
    determining a meaning for each document in the document-based information using the computer-readable data collection;
    receiving related data for the document-based information;
    calculating a weight for each document in the document-based information from the related data; and
    determining the one or more document term meanings by combining the determined meanings for each document in the document-based information, where the determined meaning for each document is weighted by the calculated weight for the document.

12. The method of claim 1, further comprising:
    determining a semantic sub-space defined by a radius of semantic distance from the knowledge item meaning;
    identifying an advertisement having an advertisement meaning that falls within the semantic sub-space; and
    presenting the advertisement.

13. A computer-readable medium encoded with a computer program,
    the program comprising instructions to perform operations, the operations comprising:
    receiving data identifying a knowledge item;

retrieving, from a database, document-based information to be used in selecting a meaning for the knowledge item, where the document-based information comprises one or more documents related to the knowledge item;

determining one or more document term meanings of the document-based information, the determining comprising, for each document in the document-based information;

selecting one or more meanings for terms in the document from meanings associated with the terms in a computer-readable data collection that associates at least one meaning with each of the terms, and then determining one or more document term meanings of the document from the one or more meanings for terms in the document;

determining a plurality of knowledge item term meanings of the knowledge item by selecting a plurality of meanings from meanings associated with one or more terms of the knowledge item in the computer-readable data collection;

determining a strength of relationship between each knowledge item term meaning and each document term meaning of the document-based information, and determining a respective selection probability for each knowledge item term meaning from the strengths; and designating knowledge item term meaning from the plurality of knowledge item term meanings as a meaning of the knowledge item according to the respective selection probability associated with each knowledge item term meaning; and storing the designated meaning of the knowledge item.

14. The computer-readable medium of claim 13, wherein the knowledge item comprises a keyword received as input to a search engine.

15. The computer-readable medium of claim 13, wherein the document-based information comprises an advertisement from an advertiser who has bid on the knowledge item.

16. The computer-readable medium of claim 15, wherein the document-based information further comprises a destination web page associated with the advertisement.

17. The computer-readable medium of claim 16, wherein the document-based information further comprises related data.

18. The computer-readable medium of claim 17, wherein the related data comprises cost per click data associated with the advertisement.

19. The computer-readable medium of claim 13, wherein the plurality of candidate knowledge item term meanings are each represented as an associated concept and wherein selecting the knowledge item term meaning comprises selecting at least one of the associated concepts.

20. The computer-readable medium of claim 13, further operable to cause processors to perform operations comprising:

establishing an initial probability, for each of the plurality of knowledge item term meanings, that the knowledge item be resolved to the one of the plurality of knowledge item term meanings, wherein the selection probabilities are further based on the initial probabilities.

21. The computer-readable medium of claim 13, wherein the plurality of knowledge item term meanings comprise a weighted vector of concepts.

22. The computer-readable medium of claim 13, wherein the plurality of knowledge item meanings comprise related clusters of words.

23. The computer-readable medium of claim 13, further operable to cause processors to perform operations comprising:

determining a meaning for each document in the document-based information using the computer-readable data collection;

receiving related data for the document-based information;

calculating a weight for each document in the document-based information from the related data; and determining the one or more document term meanings by combining the determined meanings for each document in the document-based information, where the determined meaning for each document is weighted by the calculated weight for the document.

24. The computer-readable medium of claim 13, further operable to cause processors to perform operations comprising:

determining a semantic sub-space defined by a radius of semantic distance from the knowledge item meaning;

identifying an advertisement having an advertisement meaning that falls within the semantic sub-space; and presenting the advertisement.

25. A computer-implemented method for outputting advertisements related to web page content, comprising:

receiving a keyword;

retrieving, from a database, document-based information to be used in selecting a meaning for the keyword;

determining, in a computer system comprising one or more servers, one or more document term meanings of the document-based information, the determining comprising, for one or more documents in the document-based information;

selecting one or more meanings for terms in the document from meanings associated with the terms in a computer-readable data collection that associates at least one meaning with each term, and then determining one or more document term meanings of the document from the one or more meanings for terms in the document;

determining, in the computer system, a plurality of candidate keyword meanings of the keyword by selecting a plurality of meanings from meanings associated with the keyword in the computer-readable data collection;

determining, in the computer system, a strength of relationship between each candidate keyword meaning and each document term meaning of the document-based information, and determining a respective selection probability for each candidate keyword meaning from the strengths;

selecting a keyword meaning from the plurality of candidate keyword meanings according to the respective selection probability of each candidate keyword meaning;

matching the keyword to web page content associated with a web page;

determining a semantic sub-space defined by a radius of semantic distance from the keyword meaning, identifying an advertisement having an advertisement meaning that falls within the semantic sub-space, and matching the keyword to the advertisement;

associating, in the computer system, the advertisement with the web page content; and outputting the advertisement when the web page is displayed.

26. The method of claim 25, wherein the document-based information comprises text of advertisements associated with advertisers who have bid on the keyword.

27. The method of claim 26, wherein the document-based information further comprises destination web pages associated with the advertisements.

28. The method of claim 26, wherein the document-based information further comprises other keywords bid on by the advertisers.

29. The method of claim 25, wherein the document-based information comprises search results associated with the keyword.

30. A system comprising: one or more computers programmed to perform operations comprising:
   receiving data identifying a knowledge item;
   retrieving, from a database, document-based information to be used in selecting a meaning for the knowledge item, where the document-based information comprises one or more documents related to the knowledge item;
   determining one or more document term meanings of the document-based information, the determining comprising, for each document in the document-based information;
      selecting one or more meanings for terms in the document from meanings associated with the terms in a computer-readable data collection that associates at least one meaning with each of the terms, and then determining one or more document term meanings of the document from the one or more meanings for the terms in the document;
   determining a plurality of knowledge item term meanings of the knowledge item by selecting a plurality of meanings from meanings associated with one or more terms of the knowledge item in the computer-readable data collection;
   determining a strength of relationship between each knowledge item meaning and each document term meaning of the document-based information, and determining a respective selection probability for each knowledge item term meaning from the strengths;
   designating knowledge item term meaning from the plurality of knowledge item meanings as a meaning of the knowledge item according to the respective selection probability associated with each knowledge item term meaning; and
   storing the designated meaning of the knowledge item.

31. The system of claim 30, wherein the knowledge item comprises a keyword received as input to a search engine.

32. The system of claim 30, wherein the document-based information comprises an advertisement from an advertiser who has bid on the knowledge item.

33. The system of claim 32, wherein the document-based information further comprises a destination web page associated with the advertisement.

34. The system of claim 33, wherein the document-based information further comprises related data.

35. The system of claim 34, wherein the related data comprises cost per click data associated with the advertisement.

36. The system of claim 30, wherein the plurality of knowledge item meanings are represented as an associated concept and wherein selecting the knowledge item term meaning comprises selecting at least one of the associated concepts.

37. The system of claim 30, further programmed to perform operations comprising:
   establishing an initial probability, for each of the plurality of knowledge item term meanings, that the knowledge item be resolved to the one of the plurality of knowledge item term meanings,
   wherein the selection probabilities are further based on the initial probabilities.

38. The system of claim 30, wherein the knowledge item term meaning is represented as a weighted vector of concepts.

39. The system of claim 30, wherein the knowledge item term meaning is represented as a related cluster of words.

40. The system of claim 30, further programmed to perform operations comprising:
   determining a meaning for each document in the document-based information using the computer-readable data collection;
   receiving related data for the document-based information;
   calculating a weight for each document in the document-based information from the related data; and
   determining the one or more document term meanings by combining the determined meanings for each document in the document-based information, where the determined meaning for each document is weighted by the calculated weight for the document.

41. The system of claim 30, further programmed to perform operations comprising:
   determining a semantic sub-space defined by a radius of semantic distance from the knowledge item meaning;
   identifying an advertisement having an advertisement meaning that falls within the semantic sub-space; and
   presenting the advertisement.

42. A computer-readable medium encoded with a computer program, the program comprising instructions to perform operations, the operations comprising:
   receiving a keyword;
   retrieving, from a database, document-based information to be used in selecting a meaning for the keyword, where the database associates each of a plurality of keywords with information related to the keyword, and the document-based information is related to the keyword;
   determining one or more document term meanings of the document-based information, the determining comprising, for one or more documents in the document-based information, selecting one or more meanings for terms in the document from meanings associated with the terms in a computer-readable data collection that includes terms and associates at least one meaning with each term, and then determining one or more document term meanings of the document from the one or more meanings for terms in the document;
   determining, in a computer system, a plurality of candidate keyword meanings of the keyword by selecting a plurality of meanings from meanings associated with the keyword in the computer-readable data collection;
   determining, in the computer system, a strength of relationship between each candidate keyword meaning and each document term meaning of the document-based information, and determining a respective selection probability for each candidate keyword meaning from the strengths;
   selecting a keyword meaning from the plurality of candidate keyword meanings according to the respective selection probability of each keyword meaning;
   matching the keyword to web page content associated with a web page;
   determining a semantic sub-space defined by a radius of semantic distance from the keyword meaning, identifying an advertisement having an advertisement meaning that falls within the semantic sub-space, and matching the keyword to the advertisement;
   associating, in the computer system, the advertisement with the web page content; and
   outputting the advertisement when the web page is displayed.

43. The computer-readable medium of claim 42, wherein the document-based information comprises text of advertisements associated with advertisers who have bid on the keyword.

44. The computer readable medium of claim 43, wherein the document-based information comprises destination web pages associated with the advertisements.

45. The computer readable medium of claim 43, wherein the document-based information further comprises other keywords bid on by the advertisers.

46. The computer readable medium of claim 42, wherein the document-based information further comprises search results associated with the keyword.

47. A system comprising one or more computers programmed to perform operations comprising:
receiving a keyword;
retrieving document-based information to be used in selecting a meaning for the keyword from a database, where the database associates each of a plurality keywords with information related to the keyword, and the document-based information is related to the keyword;
determining one or more document term meanings of the document-based information, the determining comprising, for one or more documents in the document-based information, selecting one or more meanings for terms in the document from meanings associated with the terms in a computer-readable data collection that includes terms and associates at least one meaning with each term, and then determining one or more document term meanings of the document from the one or more meanings for terms in the document;
determining, in the system, a plurality of keyword meanings of the keyword by selecting a plurality of meanings from meanings associated with the keyword in the computer-readable data collection;
determining, in the system, a strength of relationship between each candidate keyword meaning and each document term meaning of the document-based information, and determining a respective selection probability for each candidate keyword meaning from the strengths;
selecting a keyword meaning from the plurality of candidate keyword meanings according to the respective selection probability of each candidate keyword meaning;
matching the keyword to web page content associated with a web page;
determining a semantic sub-space defined by a radius of semantic distance from the keyword meaning, identifying an advertisement having an advertisement meaning that falls within the semantic sub-space, and matching the keyword to the advertisement;
associating, in the system, the advertisement with the web page content; and
outputting the advertisement when the web page is displayed.

48. The system of claim 47, wherein the document-based information comprises text of advertisements associated with advertisers who have bid on the keyword.

49. The system of claim 48, wherein the document-based information further comprises destination web pages associated with the advertisements.

50. The system of claim 48, wherein the document-based information further comprises other keywords bid on by the advertisers.

51. The system of claim 47, wherein the document-based information comprises search results associated with the keyword.

52. A method executed by one or more computing devices, the method comprising:
receiving a keyword, the keyword including one or more terms;
retrieving one or more documents, the one or more documents being associated with the keyword through acts of bidding;
obtaining one or more document term meanings, wherein each of the document term meanings is a meaning determined from one or more meanings of one or more terms in one of the one or more documents;
obtaining a plurality of candidate keyword meanings, each of the candidate keyword meanings comprising one or more previously-stored meanings of one or more terms of the keyword;
determining a strength of relationship between each candidate keyword meaning and each document term meaning; and
designating at least one of the candidate keyword meanings as a meaning of the keyword according to the strengths of relationships.

53. A system comprising: one or more computers programmed to perform operations comprising:
receiving a keyword, the keyword including one or more terms;
retrieving one or more documents, the one or more documents being associated with the keyword through acts of bidding;
obtaining one or more document term meanings, wherein each of the document term meanings is a meaning determined from one or more meanings of one or more terms in one of the one or more documents;
obtaining a plurality of candidate keyword meanings, each of the candidate keyword meanings comprising one or more previously-stored meanings of one or more terms of the keyword;
determining a strength of relationship between each candidate keyword meaning and each document term meaning; and
designating at least one of the candidate keyword meanings as a meaning of the keyword according to the strengths of relationships.

* * * * *

UNITED STATES PATENT AND TRADEMARK OFFICE
CERTIFICATE OF CORRECTION

| | |
|---|---|
| PATENT NO. | : 7,925,610 B2 |
| APPLICATION NO. | : 10/690328 |
| DATED | : April 12, 2011 |
| INVENTOR(S) | : Gilad Israel Elbaz et al. |

It is certified that error appears in the above-identified patent and that said Letters Patent is hereby corrected as shown below:

Column 1, Line 8 after "is" delete "a"

Column 15, Line 57-58, Claim 1, delete "information;" and insert --information:--

Column 17, Line 7-8, Claim 13, delete "information;" and insert --information:--

Column 17, Line 49, Claim 19, after "of" delete "candidate"

Column 18, Line 32, Claim 25, delete "information;" and insert --information:--

Column 19, Line 19-20, Claim 30, delete "information;" and insert --information:--

Column 21, Line 19, Claim 47, after "plurality" insert --of--

Signed and Sealed this
Fifth Day of July, 2011

David J. Kappos
*Director of the United States Patent and Trademark Office*